(12) United States Patent
Buchholz et al.

(10) Patent No.: US 6,434,968 B2
(45) Date of Patent: Aug. 20, 2002

(54) COOLING AIR ARRANGEMENT FOR A HEAT EXCHANGER OF AN AIRCRAFT AIR CONDITIONING UNIT

(75) Inventors: Uwe Albert Buchholz, Bliedersdorf; Juergen Kelnhofer, Jork, both of (DE)

(73) Assignee: Airbus Deutschland GmbH, Hamburg (DE)

( * ) Notice: Subject to any disclaimer, the term of this patent is extended or adjusted under 35 U.S.C. 154(b) by 0 days.

(21) Appl. No.: 09/818,310

(22) Filed: Mar. 27, 2001

(30) Foreign Application Priority Data

Mar. 29, 2000 (DE) .......................... 100 15 570

(51) Int. Cl.⁷ .......................... F25D 9/00; F25D 17/04
(52) U.S. Cl. .................... 62/401; 62/413; 62/414
(58) Field of Search .................. 62/401, 402, 413, 62/414

(56) References Cited

U.S. PATENT DOCUMENTS

| | | | | |
|---|---|---|---|---|
| 2,592,049 A | * | 4/1952 | Linforth et al. | 62/402 |
| 2,628,481 A | * | 2/1953 | Scofield et al. | 62/402 |
| 5,133,194 A | * | 7/1992 | Army et al. | 62/401 |
| 5,511,385 A | * | 4/1996 | Drew et al. | 62/172 |
| 5,887,445 A | * | 3/1999 | Murry et al. | 62/402 |

FOREIGN PATENT DOCUMENTS

| | | |
|---|---|---|
| GB | 1565981 | 4/1980 |
| WO | WO 92/00877 | 1/1992 |
| WO | WO 97/37890 | 10/1997 |

* cited by examiner

Primary Examiner—William C. Doerrler
(74) Attorney, Agent, or Firm—W. F. Fasse; W. G. Fasse (57) ABSTRACT

A cooling air arrangement for an aircraft air conditioning unit includes an air inlet, a heat exchanger, an outlet plenum, first and second air outlet channels branching from the plenum, and a fan arranged in the first outlet channel. During flight of the aircraft, external ram air driven into the air inlet flows primarily through the second outlet channel. During ground operation, the fan primarily sucks cooling air through the first outlet channel, which merges back into the second outlet channel at an air mixing junction that functions as an injector nozzle and a non-return flap valve. The first outlet channel is provided in a spiral housing of the fan, or in a smooth curved duct. The air inlet and outlet of the cooling air arrangement, and the air outlet of the air cycle machine, are oriented in the same direction, e.g. the flight forward direction.

29 Claims, 3 Drawing Sheets

FIG.3

COOLING AIR ARRANGEMENT FOR A HEAT EXCHANGER OF AN AIRCRAFT AIR CONDITIONING UNIT

PRIORITY CLAIM

This application is based on and claims the priority under 35 U.S.C. §119 of German Patent Application 100 15 570.7, filed on Mar. 29, 2000, the entire disclosure of which is incorporated herein by reference.

FIELD OF THE INVENTION

The invention relates to an arrangement for directing both ram air as well as fan-driven air through a heat exchanger that is used for cooling hot compressed air for an air conditioning unit of a passenger transport aircraft.

BACKGROUND INFORMATION

Modern passenger transport aircraft are typically equipped with air conditioning units, namely so-called air conditioning packs or air generation units. Hot, highly compressed engine bleed air is conveyed to the air conditioning units through suitable conduits or ducts, and in the air conditioning units is then subjected to a combined thermodynamic process generally including cooling by heat transfer through a heat exchanger, followed by compression, further intermediate cooling in a heat exchanger, and finally expansion through a turbine, to ultimately provide air conditioning air at an appropriate pressure and temperature to be introduced into the pressurized cabin of the aircraft.

During this process, which is carried out in an air cycle machine of the air conditioning unit, a substantial proportion of the total heat energy is given off or rejected by heat exchange through one or more air-to-air heat exchangers. Namely, the hot compressed engine bleed air is conveyed through a first heat exchange channel of a heat exchanger core, while a cooling air flow is conveyed through a second heat exchange channel of a heat exchanger core. The first and second heat exchange channels do not allow air flow or air exchange therebetween, but are in a thermal transfer relationship, e.g. thermally conducting, with each other. Thereby, the heat exchange core serves to transfer heat from the hot bleed air or process air to the cooling air flow.

The second channel or cooling air channel of the heat exchanger is connected to an air channel or conduit system which conveys external cooling air from the external environment outside of the aircraft into and through the heat exchanger core, and then exhausts the now-heated cooling air back out to the external environment. In this context, two different air flow conditions must be taken into account. In a first condition, when the aircraft is flying in cruise flight or during take-off and landing at a particular air speed, an inlet channel is arranged in such a manner so that ram air will be introduced into and flow through the heat exchanger. Namely, the aerodynamic pressure difference between the inlet channel and the outlet channel is used as an energy source for driving the cooling air flow through the channel system and through the heat exchanger core.

On the other hand, in a second air flow condition, when the aircraft is parked or taxiing on the ground or in low speed or low altitude flight, whereby nonetheless the air conditioning unit is to be operated to provide air conditioning air, there is insufficient or non-existent ram air flow to provide the required flow rate of cooling air, so it is necessary to mechanically drive an air flow through the heat exchanger using a turbo air machine such as a fan or blower. This turbo air machine may be rotationally driven by a rotating shaft that is driven from any source of rotational power, for example the shaft of an electric motor, or the shaft of the air cycle machine of the air conditioning unit itself.

Figure 4:
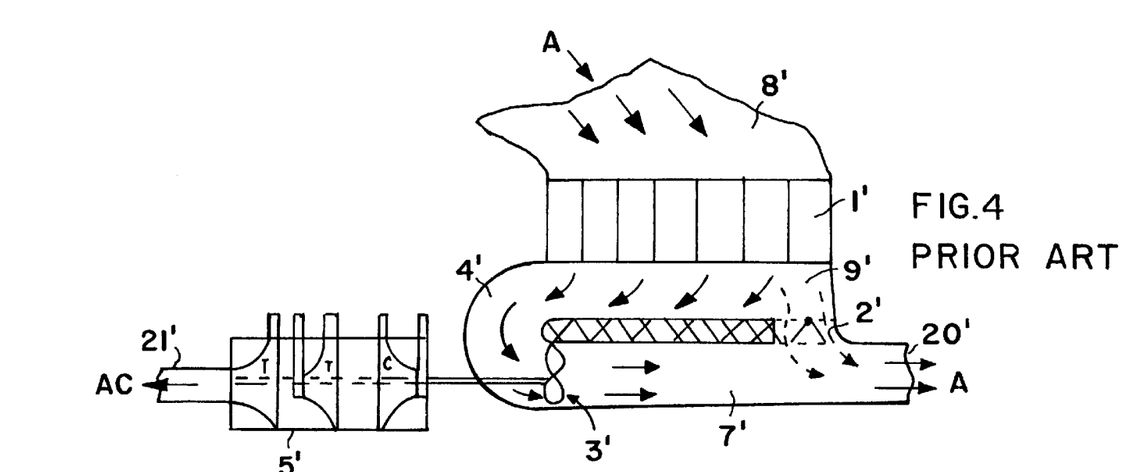
FIG. 4 is a schematic top view of a conventional cooling air arrangement as installed in present day Boeing 777/747 aircraft.
Figure 5:
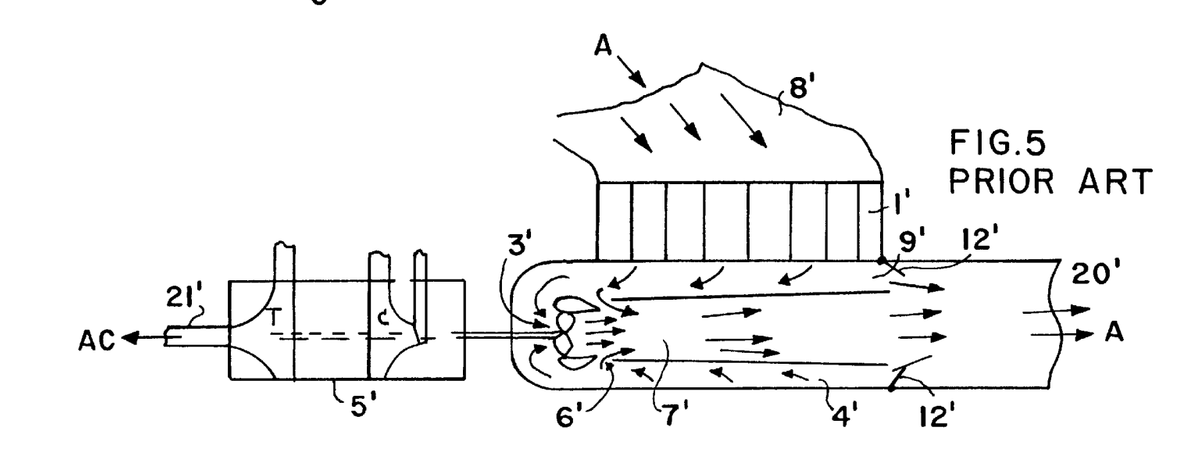
FIG. 5 is a schematic top view of a conventional cooling air arrangement as installed in present day Airbus A340 aircraft.

FIGS. 4 and 5 of the present application show two different conventional cooling air arrangements for conveying cooling air through a heat exchanger of an aircraft air conditioning unit. Particularly, FIG. 4 shows the cooling air arrangement used in the present day Boeing 747 and 777 aircraft, while FIG. 5 shows the cooling air arrangement used in the present day Airbus A340 aircraft. Each of these prior art arrangements includes a cooling air inlet channel 8' and a cooling air or heat exchanger outlet plenum 4' with the heat exchanger 1' interposed therebetween, so that the cooling air A flows from the external environment outside of the aircraft into the inlet channel 8', through the heat exchanger 1', and then to the outlet plenum 4', before being ultimately exhausted back out to the external environment outside the aircraft. Each of the arrangements further includes, as components of or extending from the outlet plenum 4', a first outlet channel 7' through which air can be mechanically blown during ground operation of the aircraft, and a second outlet channel 9' through which ram air flows during flight of the aircraft. In this context, a turbo blower or fan 3' is driven by the main shaft of the air cycle machine 5' of the air conditioning unit, and is arranged at an inlet portion of the first outlet channel 7' so as to suck air from the heat exchanger 1' and from there through the outlet plenum 4', and finally blow this air out through the first outlet channel 7'.

The mechanical, structural, aerodynamic, and air flow arrangement and configuration of the several components and particularly the outlet plenum 4', the first channel 7', the second channel 9', and the turbo blower or fan 3' are very significant and rather complicated to design. Namely, the design and configuration of the arrangements must take into account the two different operating conditions, i.e. air flow conditions, that have been described above, as well as the altitude dependent variation of the air density, the aerodynamic conditions and flow patterns of air outside of the aircraft, the arrangement and orientation of the air cycle machine 5' relative to the aircraft and relative to the heat exchanger arrangement, and the like. For example, the shaft orientation of the associated air cycle machine that is driving the fan 3' necessitates an axis-parallel orientation of the heat exchanger arrangement in order to achieve an optimal air flow of the turbo blower or fan 3'. Mounted on the same shaft as the fan 3', the air cycle machine 5' includes one or more compressors C and turbines T for compressing and expanding the process air, to ultimately provide the cooled air conditioning air AC from the air outlet 21'. Therefore, the orientation of the installed air cycle machine 5' is specified based on other considerations, and typically the expansion turbine T and particularly the air conditioning air outlet 21' of the air cycle machine 5' must be oriented lying in the flight direction, while the flow of cooling air A being exhausted from the outlet plenum 4' must be oriented opposite thereto, namely opposite the flight direction of the aircraft.

Taking the above considerations into account, the prior art arrangements of FIGS. 4 and 5 both have an overall air flow pattern of the cooling air A substantially in an S-shape or Z-shape, especially with regard to the fan-driven air flow during ground operation of the aircraft. The conventional arrangements further both use a bypass system in which ram air, to the extent that it is available, will first bypass the first outlet channel 7' and instead flow directly from the outlet plenum 4' out through the second channel 9' to the exhaust outlet. In the conventional Boeing arrangement shown in FIG. 4, this bypass arrangement is achieved with non-return air valves or one-way check valves 2', and in the conventional Airbus arrangement shown in FIG. 5, this bypass arrangement is achieved with an air injector arrangement 6' as well as non-return flaps 12'.

In view of the above, the air inlet channel 8' in the prior art arrangements generally faces forward in the flight direction, while the exhaust air outlet 20' generally faces rearwardly or downstream relative to the flight direction, as shown in FIGS. 4 and 5. If the conventionally known installation orientation of the equipment is changed, then it may become necessary to achieve a common orientation of the expansion turbine outlet 21', the heat exchanger inlet 8', and the outlet plenum exhaust outlet 20' all facing in the same direction, e.g. in the flight direction. Any attempt to achieve such a configuration or orientation using the cooling air arrangements according to conventional FIGS. 4 and 5 would be impossible or suffer considerable aerodynamic disadvantages, or would simply not be able to achieve acceptable operating characteristics.

Namely, additional air channels as well as air flow redirecting elbows or channel curve members, as well as additional valves or air flaps would have to be provided in the arrangement. This would lead to a disadvantageous increase of the installation size and weight of the overall arrangement, as well as requiring additional maintenance efforts. Also, the aerodynamic efficiency of the cooling air channel directing air through the heat exchanger would be reduced due to the extra air channel components and deflections, and heat exchange energy would thereby be lost. It would also be necessary to increase the size of the various air channel components to try to compensate for such a loss of aerodynamic efficiency, which in turn would result in a greater installation space requirement as well as an increased total weight in the aircraft.

SUMMARY OF THE INVENTION

In view of the above, it is an object of the invention to provide a cooling air arrangement for a heat exchanger of an aircraft air conditioning unit with an integrated turbo blower or fan, which achieves a very compact arrangement with an efficient air flow and low flow energy losses, especially for an orientation and arrangement of the components in which the air inlets and air outlet directions face generally in the same direction, and particularly the flight direction of the aircraft. The invention further aims to avoid or overcome the disadvantages of the prior art, and to achieve additional advantages, as apparent from the present specification.

The above objects have been achieved according to the invention in a cooling air arrangement for an aircraft air conditioning unit, comprising a cooling: air inlet channel and a cooling air outlet plenum that are each connected to the external environment outside of the aircraft, and a heat exchanger with second heat exchange passages interposed between the cooling air inlet channel and the cooling air outlet plenum and with first heat exchange passages interposed between a source of hot compressed air such as engine bleed air and the process air inlet of an air cycle machine of the air conditioning unit. According to the invention, the cooling air outlet plenum is divided into or connected to a first outlet channel and a second outlet channel, which will respectively convey the cooling air to the cooling air exhaust outlet dependent on the operating conditions. The second channel extends from the outlet plenum, or substantially forms the outlet plenum, and is connected directly to the outlet side of the heat exchanger. The first channel is branched off of this portion of the second channel in the area of the cooling air plenum, and an outlet end of the first channel then leads back into an air mixing junction or portion of the second channel.

A turbo blower or fan is installed in the inlet area of the first channel, so as to suck cooling air through the heat exchanger during ground operation of the aircraft. On the other hand, during normal flight of the aircraft, ram air is directly driven through the second channel by the pressure difference between the cooling air inlet and the cooling air exhaust outlet. The first channel is particularly provided as a channel in an air guide device which may have an axial, diagonal or radial configuration. For example, the air guide device may comprise a pipe section, a spiral housing, or a plate diffuser respectively defining the first air channel. An air injector or particularly an air injector flap may be arranged between or adjoining the first channel and the second channel in the area of the air mixing junction where the two air channels rejoin each other. This injection flap carries out the function of an injector nozzle or a non-return flap valve depending on the particular operating conditions, so as to allow a proper and compatible air flow of ram air through the second outlet channel and fan-driven air through the first outlet channel.

According to a further detailed feature of the invention, the overall air flow pattern of cooling air through the inventive cooling arrangement is generally a U-shape, namely entering the cooling air inlet from the forward flight direction, then deflecting by substantially a half-turn (e.g. at least 150°) through the heat exchanger, to then be ultimately discharged through the cooling air exhaust outlet channel in a generally flight forward direction, possibly with further deflection. Thus, the air flow deflection of the entire cooling arrangement is, for example, at least 135°. The cooling air inlet and the cooling air exhaust outlet channel extending from the present arrangement preferably both are oriented generally toward the forward flight direction, as is the air conditioning air outlet of the air cycle machine of the air conditioning unit.

BRIEF DESCRIPTION OF THE DRAWINGS

In order that the invention may be clearly understood, it will now be described in connection with example embodiments, with reference to the accompanying drawings, wherein.

DETAILED DESCRIPTION OF PREFERRED EXAMPLE EMBODIMENTS AND OF THE BEST MODE OF THE INVENTION

The conventional arrangements according to FIGS. 4 and 5 will not be described further here, because they have been adequately discussed in the above Background Information section of this specification. Moreover, a person of ordinary skill in the art will be familiar with and have additional information available regarding these prior art configurations as shown in FIGS. 4 and 5.

Figure 1:
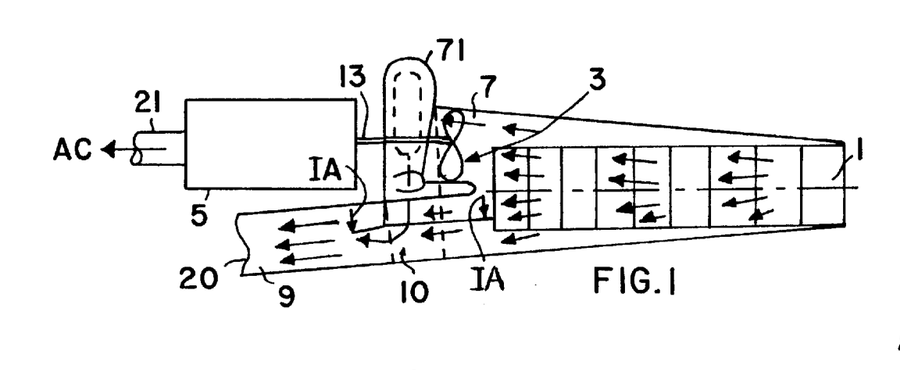
FIG. 1 is a schematic side view of a first embodiment of a cooling air arrangement for a heat exchanger of an aircraft air conditioning unit according to the invention.
Figure 2:
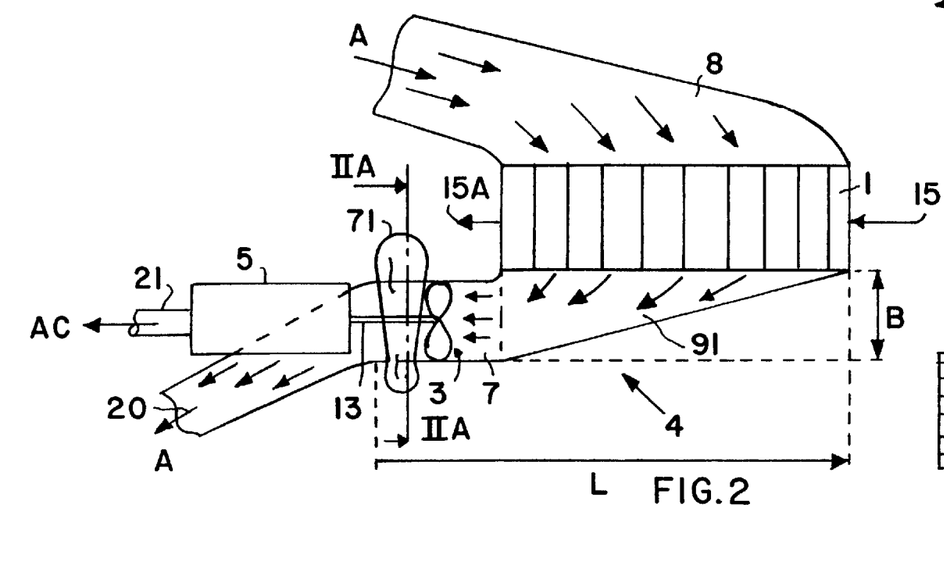
FIG. 2 is a schematic top view of the arrangement of FIG. 1.

FIG. 1 shows a schematic side view of a first example embodiment of a cooling air arrangement for a heat exchanger of an aircraft air conditioning unit according to the invention. FIG. 2 shows a schematic top view of the same arrangement. The arrangement primarily comprises a cooling air inlet channel 8, a heat exchanger 1 primarily including a heat exchanger core, and an air outlet channel system including a heat exchanger plenum or cooling air outlet plenum 4, and a two-part divided outlet air channel including a first outlet channel 7 and a second outlet channel 9. An air-sucking turbo blower or fan 3 is integrated into the first outlet channel 7.

The heat exchanger 1 includes first heat exchange passages that receive hot compressed air, e.g. engine bleed air, from a hot air supply channel 15. The heat exchanger 1 further includes second heat exchange passages that are in a heat exchange relation with the first heat exchange passages. Cooling air A from the external environment immediately outside of the aircraft flows into the air inlet channel 8, through the second heat exchange passages of the heat exchanger 1, and then into the outlet plenum 4, and further through either one or both of the outlet channels 7 and 9, to be finally exhausted through the exhaust air outlet 20 back to the external environment outside of the aircraft. Note that reference number 20 does not label the actual outlet end that opens to the exterior environment, but rather labels the exhaust air duct or channel which is shown broken off and which ultimately leads to the exhaust outlet itself. During the air flow process, heat is given off from the hot bleed air in the first heat exchange passages to the cooling air in the second heat exchange passages of the heat exchanger 1, whereby the hot bleed air is cooled and provided at a cooled process air outlet. 15A. On the other hand, the cooling air A becomes heated as it passes through the heat exchanger 1.

As has been generally discussed above, the flow of cooling air A proceeds differently under different operating conditions. During normal forward flight of the aircraft, the cooling air is effectively pressed into the cooling air inlet channel 8 as ram air. For this purpose, the inlet end of the cooling air channel 8 is located at a relatively high pressure area of the outside of the aircraft fuselage, and particularly includes a forward fading air intake that stagnates the oncoming flow of air and causes a ram effect. On the other hand, the cooling air exhaust outlet 20 is located at a relatively lower pressure area of the outside of the aircraft fuselage, so that the pressure difference between the inlet and the outlet drives the flow of cooling air A through the inlet channel 8, the heat exchanger 1, the outlet plenum 4, and at least the second air outlet channel 9, which can thus also be designated as a ram air outlet channel 9.

On the other hand, when the aircraft is on the ground, either parked or taxiing, or in slow or low altitude flight conditions in which there is insufficient ram cooling air, but in which the air conditioning unit is operating and requires cooling air for the heat exchanger 1, the turbo blower or fan 3 operates to actively suck the cooling air A into the air inlet channel 8, through the heat exchanger 1, and then through the first outlet channel 7 equipped with the blower or fan 3. Thus, the first air channel can be designated as a fan-driven air channel 7.

Particularly according to the present embodiment of the invention, the second outlet channel 9 is connected directly to and/or extends from the outlet plenum 4. Another way of considering this is that a plenum portion 91 of the second outlet channel 9 forms the outlet plenum 4. FIG. 2 also illustrates the length L and the width B of the air outlet plenum 4, especially formed by the plenum portion 91 of the second air outlet channel 9, and generally including the entire portion of the second air outlet channel 9 upstream of a constricted or reduced cross-sectional area of the throat thereof in the air mixing junction 10. The first outlet channel 7 branches off from the second outlet channel 9, for example from the plenum portion 91 thereof. The flow of cooling air. A will be divided and apportioned between the first outlet channel 7 and the second outlet channel 9, depending on the operating condition as described above. Thereby, a respective portion of the total cooling air flow can flow through each of the two channels 7 and 9, or the entire cooling air flow under any particular condition may flow through a single operative one of the two channels 7 and 9. The details of this divided air flow will be described further below.

Figure 1A:
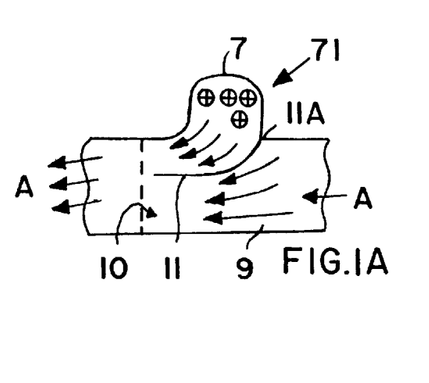
FIG. 1A is a schematic sectional view of a portion of the arrangement of FIG. 1, taken along the section line IA—IA.

A downstream end of the first air channel 71 is connected or merged back into the second air channel 9 at an air mixing junction 10. In this context, the first channel 7 reduces the enclosed cross-section of the second channel 9 by its own cross-sectional area at this mixing junction 10, as shown in FIG. 1A. The blower or fan 3 is installed in the first outlet channel 7 between its inlet junction with the second outlet channel 9, and the air mixing junction 10. With this arrangement, the two channels are connected flow-parallel with each other, i.e. not strictly mechanically parallel but establishing a parallel (rather than series) flow of air respectively therethrough. Also in this context, the second ram air outlet channel 9 can be regarded as the primary or principle channel, while the first outlet channel 7 forms a partial loop that branches off from and then rejoins the second channel 9.

Downstream from the air mixing junction 10, an outlet portion of the second channel 9, which may be referred to as a unified outlet channel since the two separate first and second channels have been rejoined or unified therein by the air mixing junction, extends substantially straight relative to the second channel portion leading into the air mixing junction. A lateral deflection of this unified outlet channel, as shown in the top view of FIG. 2, may be necessary for the unified outlet channel to clear around the air cycle machine 5, for example. Generally, if one defines a fan plane as extending through the fan 3 perpendicularly to the axis of the fan shaft 13, then the unified outlet channel extends from the air mixing junction 10 downstream toward the exhaust air outlet 20 on the same side of the fan plane as the fan shaft 13 extends from the fan 3 outwardly out of the first outlet channel toward the air cycle machine 5. More particularly, the unified outlet channel extends in a direction that is generally aligned with the axis of the shaft 13 of the fan 3, e.g. no more than 30° divergent from parallel to the axis of the fan shaft.

In the forward flight operating condition, the cooling air is driven through the air channel arrangement by a ram effect, as described above. In this situation, the cooling air A that has passed through the heat exchanger 1 and thereby becomes heated, is then further driven through the outlet plenum 4 and primarily through the second outlet channel 9.

However, a rather small portion of the cooling air A may also be driven through the first outlet channel 7 and flow past the blower or fan 3, which in effect is just idling with the air flowing therethrough in this condition. At the air mixing junction 10, these two partial air flows will be reunited and mixed together. The proportionally substantially smaller air flow through the first outlet channel 7 is driven by the relatively higher pressure at the inlet end of the first outlet channel 7 in comparison to the relatively lower pressure created at the mixing air junction 10, due to the effect of the reduced cross-sectional area of the second outlet channel 9 and the resulting acceleration of the air flow therethrough. Thus, the air mixing junction 10 has the effect of an injector nozzle or a jet pump in this manner (see FIG. 1A).

The air flow situation is different when the aircraft is on the ground or at a low flight altitude, i.e. when there is no ram air or insufficient ram air being forced into the inlet channel 8. Under such operating conditions, the turbo blower or fan 3 must be operated to actively draw air through the heat exchanger 1. To achieve this, the blower or fan 3 is preferably mounted on an end of the rotating drive shaft 13 of the air cycle machine 5 of the air conditioning unit of the aircraft. This air cycle machine 5 includes, e.g., at least one compressor and at least one turbine mounted on the same rotating drive shaft 13 with the blower or fan 3. Throughout this specification, the term "fan" will be used generally to refer to any type of rotating air-moving device, such as radial, axial, or diagonal flow fans, blowers, ventilators, and the like. In any event, whenever the air cycle machine 5 is operating, the fan 3 will also be rotating with the shaft 13, unless a de-coupling clutch is provided, which is an option.

Whenever there is an insufficient ram air flow, the fan 3 will actively move a sufficient quantity of cooling air through the heat exchanger 1 and through the first air outlet channel 7 to the air mixing junction 10. As this air is forcefully driven from the first outlet channel 7 into the air mixing junction 10, where it merges into the second air outlet channel 9, the air mixing junction 10 achieves an air injector nozzle or jet pump effect, which draws an additional quantity of cooling air through the second outlet channel 9, by a suction effect created by the positively driven air flow through the mixing junction 10 (see FIG. 1A).

Under both operating conditions, the two air flows respectively flowing through the first outlet channel 7 and the second outlet channel 9 are reunited at the air mixing junction 10, to then flow together through the unified outlet portion of the second outlet channel 9 leading to the cooling air exhaust outlet 20. With regard to FIGS. 1 and 2, it is noted that the united or combined outlet portion of the second outlet channel 9 extends in a generally flight-forward direction of the aircraft toward and along the side of the air cycle machine 5 of the air conditioning unit. This is also the direction in which the air conditioning air AC is output by the air cycle machine 5 at its air conditioning air outlet 21. This is further the direction in which the air inlet channel 8 extends from the heat exchanger 1, so that the overall air channel arrangement has a U-shape or a J-shape, or the shape of a smoking pipe. Generally, it is seen that the cooling air flow is directed through a nearly 180° direction reversal or deflection as it flows through the heat exchanger 1. In the illustrated embodiment of FIG. 2, the ultimate flow deflection between the inlet and outlet is about 135°, but the flow deflection through the heat exchanger is about 160°.

Figure 2A:
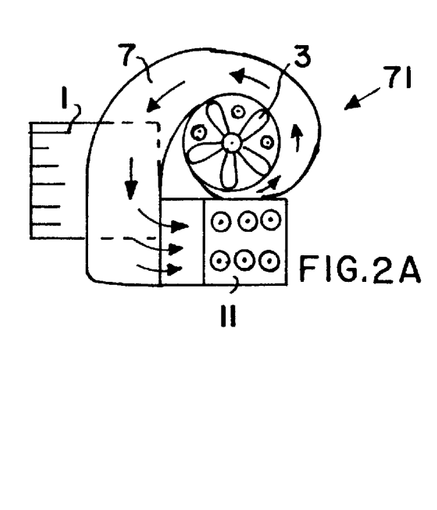
FIG. 2A is a schematic sectional view of a portion of the arrangement of FIG. 2, taken along the section line IIA—IIA.

As can be understood especially from FIGS. 1, 2 and 2A, the first air outlet channel 7 in the present example embodiment is preferably embodied in an air guide device 71, which, for example, comprises a spiral housing, or a spiral-wound pipe with a spiral or circumferential curvature of the first air outlet channel 7 defined in this air guide device 71. Alternatively, the air guide device 71 may comprise a plate diffuser through which the cooling air is directed. Conveniently, the air guide device 71 may be a spiral housing of the fan 3 or directly connected to the fan 3, for example the housing of a radial or centrifugal blower. Such an arrangement provides a compact structure while providing efficient use and redirection of the fan output air flow, and allows the first air channel 7 to be branched off from and then rejoined into the second air channel 9, while maintaining a substantially straight continuous air flow path in the second air channel 9.

Now referring again more particularly to FIGS. 1A and 2A, special details of the air mixing junction 10 or in general the junction area at which the first air outlet channel 7 rejoins into the second air outlet channel 9, will be described. As can be seen, the air mixing junction 10 is connected to the outlet side of the air guide device 71, and merges into the second air outlet channel 9. Thereby, a cross-sectional area of the second outlet channel 9 is reduced, as mentioned, to form a throat area, which is preferably bounded by a deflectable or pivotable injector flap 11 as shown in FIG. 1A. For example, this flap 11 is pivoted along a hinge pin 11A. This injector flap 11 forms the constricted throat of the second air outlet channel 9, to create the injector nozzle or jet pump effect that has been described above.

The pivotal position or the flexible deflected position of the injector flap 11 will vary dependent on the aerodynamic flow conditions within the air mixing junction 10. Namely, the air injector flap 11 will take up the appropriate position at any time for achieving the optimum cooling air flow, while balancing the air flow between the first outlet channel 7 and the second outlet channel 9 in the different operating conditions, as has been described above. It is alternatively possible to provide a fixed rigid injector flap 11, which has a constant fixed position. Also, the injector flap 11 preferably has a curved contour as shown in FIG. 1A, but may alternatively have a straight or flat planar contour. Particularly, the curvature of the injector flap 11 is a generally parabolic curvature that extends from the outlet of the first air outlet channel 7 and curves in the flow direction of the air toward the cooling air exhaust outlet 20, so as to deflect the air flow from the first outlet channel 7 in the appropriate direction.

The preferably flexibly deflectable or pivotable injector flap 11 serves the functions both of an injector nozzle and a non-return one-way flap valve. Namely, when the injector flap 11 is in an intermediate position as shown in FIG. 1A, thereby allowing an open flow passage from both the first outlet channel 7 and the second outlet channel 9 through the air mixing junction 10, while creating a reduced cross-sectional throat of the second outlet channel 9, this injector flap 11 forms the above described air injector nozzle or jet pump. This effect is also achieved with a fixed or stationary ejector flap 11. This applies to both the ram air condition during flight, and the fan-driven air flow condition during ground operation, but with respectively opposite suction effect, i.e. a reversal of which air flow is the driving air flow and which air flow is the driven air flow, as described above.

On the other hand, if the air flow provided through either the first outlet channel 7 or the second outlet channel 9 is so strong that it causes the pivotable or deflectable air injector flap 11 to tilt or pivot entirely toward the respective opposite air outlet channel, thereby closing off this other outlet channel, then the flap 11 functions as a non-return flap valve.

For example, when the fan 3 is driving a substantial air flow through the first air outlet channel 7, then the injector flap 11 will close the throat of the second air outlet channel 9, thereby acting as a non-return valve and preventing an unintended back flow circulation of fan-driven air in a reverse direction through the second air outlet channel 9 back into the inlet of the first air outlet channel 7. Alternatively, during ram air conditions, if a sufficient ram air flow is flowing through the second air outlet channel 9, then the flap 11 will tilt upwardly to close off the first air outlet channel 7, and thereby provide a greater flow cross-section through the throat of the second air outlet channel 9, and bypassing the flow resistance of the idling fan 3 in this condition. Thereby, the flow resistance overall is reduced.

The flap 11 may be spring-biased or gravitationally-biased in any manner to achieve the desired operation thereof. As a further option according to the invention, the position of the air injector flap 11 may be actively driven by any suitable actuator, so that the air injector flap 11 can be positively set to any desired position that is appropriate for the respective prevailing operating condition. In addition to or instead of the injector flap 11, a non-return flap valve can be arranged in the second channel 9 or in the first channel 7 above the air mixing junction 10, for example especially to prevent an unintended back flow of air in an arrangement with a fixed injector flap 11.

Figure 3:
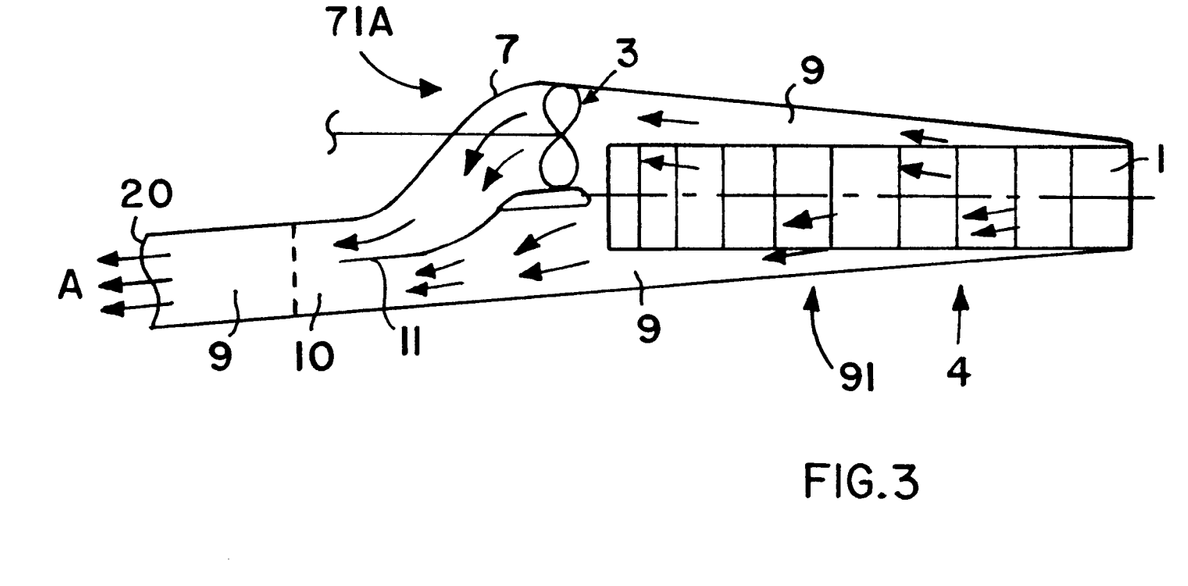
FIG. 3 is a schematic side view of a simplified embodiment of a cooling air arrangement according to the invention.

FIG. 3 is a schematic side view of a simplified further embodiment of the cooling air arrangement according to the invention. Components generally corresponding to those of the above described embodiment are labeled with the same reference numbers as above. A redundant description will not be provided here. The principle difference of this embodiment relative to the embodiment of FIGS. 1, 1A, 2 and 2A, is a simplification or difference of the air guide device 71 providing or defining the first air outlet channel 7. In this embodiment, rather than the above described spiral configuration of the air guide device 71, the present air guide device 71A is simply a smoothly contoured duct member in which the fan 3 is arranged.

The plenum portion 91 of second air outlet channel 9, or the outlet plenum 4, is configured and split in a Y-shape, whereby the inlet end of the first air outlet channel 7 is joined onto one of the two split arms of the Y-shape, and the fan 3 is arranged in the vicinity of this inlet end of the second air outlet channel 7. From there, the first air outlet channel 7 slopes at an angle downwardly and in the flow direction of air through the second channel 9, i.e. toward the left in FIG. 3, while also tapering to a reduced cross-sectional area at the air mixing junction 10, at which the first air outlet channel 7 is reunited into the second air outlet channel 9. Thereby, the air injection flap 11 separates the reduced cross-sectional area of the first air channel 7 from the reduced cross-sectional area of the second air channel 9. The functioning of the present embodiment of the cooling air arrangement corresponds to the above described functioning of the first embodiment of the inventive cooling air arrangement.

The inventive cooling air arrangement achieves an advantageous combination and orientation of the air cycle machine 5 (for example referring to the orientation of the expansion turbine outlet 21 providing the air conditioning air AC), the heat exchanger 1, the air inlet 8, and the outlet plenum 4. Particularly, the inventive arrangement allows the air inlet of the cooling arrangement, the air outlet of the cooling arrangement, and the air outlet of the air cycle machine to be oriented all generally in the same direction, e.g. the flight forward direction of the aircraft. This allows convenient and compact installation in aircraft in which the prior art arrangements would not have been suitable or would have required significant additional air ducting or the like to redirect the air flow into a different direction. These advantages of the invention are achieved without impairing the aerodynamic characteristics, but rather achieving an improved air flow with reduced air flow resistance in comparison to the prior art. This is true for all of the different operating conditions as described above. This is also achieved with a relatively low total structural weight and compact structural size of the arrangement installed in an aircraft.

Although the invention has been described with reference to specific example embodiments, it will be appreciated that it is intended to cover all modifications and equivalents within the scope of the appended claims. It should also be understood that the present disclosure includes all possible combinations of any individual features recited in any of the appended claims. Throughout this specification, the terms "downstream" and "upstream" refer to the portions or locations of the components with reference to the normal air flow direction through the respective components.

What is claimed is:

1. A cooling air arrangement for a heat exchanger of an air conditioning unit of an aircraft, comprising:

an air inlet channel;

an air outlet channel system including an outlet plenum, a first outlet channel, a second outlet channel, a unified outlet channel, and an air mixing junction, wherein said first and second outlet channels are both connected at least indirectly to and communicate with said outlet plenum and are both connected flow-parallel with each other, wherein a downstream end of said first outlet channel is connected to said second outlet channel at said air mixing junction, and wherein said unified outlet channel is connected to and extends downstream from said air mixing junction;

a fan unit including a rotatable drive shaft and a fan mounted on said drive shaft for rotation therewith, wherein said fan is arranged in said first outlet channel and said drive shaft extends outwardly out of said first outlet channel, and wherein said fan is located on a fan plane that extends perpendicularly relative to an axis of said drive shaft; and a heat exchanger having first and second heat exchange passages that are in heat exchange relation with each other, wherein said heat exchanger is interposed between said air inlet channel and said outlet plenum to establish flow communication from said air inlet channel through said second heat exchange passage to said outlet plenum;

wherein:

said unified outlet channel leads to and terminates at an exhaust air outlet;

said unified outlet channel extends from said air mixing junction downstream toward said exhaust air outlet, on the same side of said fan plane as said drive shaft extending outwardly out of said first outlet channel;

an upstream end of said second outlet channel is connected directly to or integrated into said outlet plenum;

said outlet plenum is connected directly to said heat exchanger;

an upstream end of said first outlet channel is connected directly to said second outlet channel so that said first outlet channel is branched off from said second outlet channel;

said unified outlet channel is an extension of said second outlet channel; and said first outlet channel is rejoined back into said second outlet channel by said air mixing junction which is integrated into said second outlet channel.

2. The cooling air arrangement according to claim 1, wherein said unified outlet channel extends downstream from said air mixing junction in a direction that is not more than 30° divergent from parallel with said axis of said drive shaft.

3. The cooling air arrangement according to claim 1, wherein said fan is a suction fan that is configured and adapted to move air through said first outlet channel across said fan plane in a direction toward said drive shaft.

4. The cooling air arrangement according to claim 1, wherein said first outlet channel comprises an air guide device that is configured, arranged and adapted to direct air axially from said fan toward said air mixing junction.

5. The cooling air arrangement according to claim 1, wherein said first outlet channel comprises an air guide device that is configured, arranged and adapted to direct air circumferentially from said fan toward said air mixing junction.

6. The cooling air arrangement according to claim 1, wherein said first outlet channel comprises a spiral housing with a spiral air path therein.

7. The cooling air arrangement according to claim 1, wherein said first outlet channel comprises a curved air duct.

8. The cooling air arrangement according to claim 7, wherein said curved air duct has a cross-sectional area that tapers toward said downstream end of said first outlet channel.

9. The cooling air arrangement according to claim 1, further comprising a plate diffuser interposed in an air flow path through said first outlet channel.

10. The cooling air arrangement according to claim 1, wherein said air mixing junction comprises an injector flap that protrudes from said downstream end of said first outlet channel into a flow cross-section of said second outlet channel thereby reducing a dimensional size of said flow cross-section, and that extends toward said unified outlet channel.

11. The cooling air arrangement according to claim 10, wherein said injector flap is curved as it protrudes from said downstream end of said first outlet channel and extends toward said unified outlet channel.

12. The cooling air arrangement according to claim 10, wherein said injector flap is flat and planar as it protrudes from said downstream end of said first outlet channel and extends toward said unified outlet channel.

13. The cooling air arrangement according to claim 10, wherein said injector flap is a rigid fixed flap.

14. The cooling air arrangement according to claim 10, wherein said injector flap is pivotally mounted relative to said first and second outlet channels.

15. The cooling air arrangement according to claim 14, wherein said injector flap is configured and arranged to be pivotal to a first position in which it closes said flow cross-section of said second outlet channel.

16. The cooling air arrangement according to claim 15, wherein said injector flap is configured and arranged to be pivotal to a second position in which it closes said downstream end of said first outlet channel.

17. The cooling air arrangement according to claim 15, further comprising an actuator connected to said injector flap and adapted to pivotally move said injector flap.

18. The cooling air arrangement according to claim 1, wherein said air mixing junction comprises an air injector nozzle.

19. The cooling air arrangement according to claim 1, wherein said air mixing junction comprises a non-return one-way flap valve.

20. A cooling air arrangement for a heat exchanger of an air conditioning unit of an aircraft, comprising:

an air inlet channel;

an air outlet channel system including an outlet plenum, a first outlet channel, a second outlet channel, a unified outlet channel, and an air mixing junction, wherein said first and second outlet channels are both connected at least indirectly to and communicate with said outlet plenum and are both connected flow-parallel with each other, wherein a downstream end of said first outlet channel is connected to said second outlet channel at said air mixing junction, and wherein said unified outlet channel is connected to and extends downstream from said air mixing junction;

a fan unit including a rotatable drive shaft and a fan mounted on said drive shaft for rotation therewith, wherein said fan is arranged in said first outlet channel and said drive shaft extends outwardly out of said first outlet channel, and wherein said fan is located on a fan plane that extends perpendicularly relative to an axis of said drive shaft; and a heat exchanger having first and second heat exchange passages that are in heat exchange relation with each other, wherein said heat exchanger is interposed between said air inlet channel and said outlet plenum to establish flow communication from said air inlet channel through said second heat exchange passage to said outlet plenum;

wherein said unified outlet channel leads to and terminates at an exhaust air outlet;

wherein said unified outlet channel extends from said air mixing junction downstream toward said exhaust air outlet, on the same side of said fan plane as said drive shaft extending outwardly out of said first outlet channel; and wherein said first outlet channel extends from said fan to said air mixing junction along a path that is not linearly and not coaxially aligned with said axis of said drive shaft.

21. A cooling air arrangement for a heat exchanger of an air conditioning unit of an aircraft, comprising:

an air inlet channel;

an air outlet channel system including an outlet plenum, a first outlet channel, a second outlet channel, a unified outlet channel, and an air mixing junction, wherein said first and second outlet channels are both connected at least indirectly to and communicate with said outlet plenum and are both connected flow-parallel with each other, wherein a downstream end of said first outlet channel is connected to said second outlet channel at said air mixing junction, and wherein said unified outlet channel is connected to and extends downstream from said air mixing junction;

a fan unit including a rotatable drive shaft and a fan mounted on said drive shaft for rotation therewith, wherein said fan is arranged in said first outlet channel and said drive shaft extends outwardly out of said first outlet channel, and wherein said fan is located on a fan plane that extends perpendicularly relative to an axis of said drive shaft; and a heat exchanger having first and second heat exchange passages that are in heat exchange relation with each other, wherein said heat exchanger is interposed between said air inlet channel and said outlet plenum to establish flow communication from said air inlet channel through said second heat exchange passage to said outlet plenum;

wherein said unified outlet channel leads to and terminates at an exhaust air outlet;

wherein said unified outlet channel extends from said air mixing junction downstream toward said exhaust air outlet, on the same side of said fan plane as said drive shaft extending outwardly out of said first outlet channel; and wherein said first outlet channel comprises an air guide device that is configured, arranged and adapted to direct air radially or diagonally from said fan toward said air mixing junction.

22. The cooling air arrangement according to claim 21, wherein said air guide device is configured, arranged and adapted to direct air radially from said fan toward said air mixing junction.

23. The cooling air arrangement according to claim 21, wherein said air guide device is configured, arranged and adapted to direct air diagonally from said fan toward said air mixing junction.

24. A cooling air arrangement for a heat exchanger of an air conditioning unit of an aircraft, comprising:

an air inlet channel;

an air outlet channel system including an outlet plenum, a first outlet channel, a second outlet channel, a unified outlet channel, and an air mixing junction, wherein said first and second outlet channels are both connected at least indirectly to and communicate with said outlet plenum and are both connected flow-parallel with each other, wherein a downstream end of said first outlet channel is connected to said second outlet channel at said air mixing junction, and wherein said unified outlet channel is connected to and extends downstream from said air mixing junction;

a fan unit including a rotatable drive shaft and a fan mounted on said drive shaft for rotation therewith, wherein said fan is arranged in said first outlet channel and said drive shaft extends outwardly out of said first outlet channel, and wherein said fan is located on a fan plane that extends perpendicularly relative to an axis of said drive shaft;

a heat exchanger having first and second heat exchange passages that are in heat exchange relation with each other, wherein said heat exchanger is interposed between said air inlet channel and said outlet plenum to establish flow communication from said air inlet channel through said second heat exchange passage to said outlet plenum; and an air cycle machine including at least one of a compressor and a turbine mounted on said drive shaft for rotation therewith in a machine housing;

wherein said unified outlet channel leads to and terminates at an exhaust air outlet;

wherein said unified outlet channel extends from said air mixing junction downstream toward said exhaust air outlet, on the same side of said fan plane as said drive shaft extending outwardly out of said first outlet channel;

wherein said air cycle machine includes a process air inlet connected to said first heat exchange passage and a process air outlet; and wherein said unified outlet channel extending downstream from said air mixing junction is directed toward and extends along an outside of said machine housing of said air cycle machine.

25. The cooling air arrangement according to claim 24, wherein said unified outlet channel extends below said machine housing of said air cycle machine.

26. A cooling air arrangement for a heat exchanger of an air conditioning unit of an aircraft, comprising:

an air inlet channel;

an air outlet channel system including an outlet plenum, a first outlet channel, a second outlet channel, a unified outlet channel, and an air mixing junction, wherein said first and second outlet channels are both connected at least indirectly to and communicate with said outlet plenum and are both connected flow-parallel with each other, wherein a downstream end of said first outlet channel is connected to said second outlet channel at said air mixing junction, and wherein said unified outlet channel is connected to and extends downstream from said air mixing junction;

a fan unit including a rotatable drive shaft and a fan mounted on said drive shaft for rotation therewith, wherein said fan is arranged in said first outlet channel and said drive shaft extends outwardly out of said first outlet channel, and wherein said fan is located on a fan plane that extends perpendicularly relative to an axis of said drive shaft; and a heat exchanger having first and second heat exchange passages that are in heat exchange relation with each other, wherein said heat exchanger is interposed between said air inlet channel and said outlet plenum to establish flow communication from said air inlet channel through said second heat exchange passage to said outlet plenum;

wherein said unified outlet channel leads to and terminates at an exhaust air outlet;

wherein said unified outlet channel extends from said air mixing junction downstream toward said exhaust air outlet, on the same side of said fan plane as said drive shaft extending outwardly out of said first outlet channel; and wherein said air inlet channel, said heat exchanger, and said air outlet channel system together have an overall U-shaped or J-shaped configuration.

27. The cooling air arrangement according to claim 26, wherein said air inlet channel, said heat exchanger, and said air outlet channel system together have said overall U-shaped configuration.

28. The cooling air arrangement according to claim 26, wherein said air inlet channel, said heat exchanger, and said air outlet channel system together have said overall J-shaped configuration.

29. A cooling air arrangement for a heat exchanger of an air conditioning unit of an aircraft, comprising:

an air inlet channel;

an air outlet channel system including an outlet plenum, a first outlet channel, a second outlet channel, a unified outlet channel, and an air mixing junction, wherein said first and second outlet channels are both connected at least indirectly to and communicate with said outlet plenum and are both connected flow-parallel with each other, wherein a downstream end of said first outlet channel is connected to said second outlet channel at said air mixing junction, and wherein said unified outlet channel is connected to and extends downstream from said air mixing junction;

a fan unit including a rotatable drive shaft and a fan mounted on said drive shaft for rotation therewith, wherein said fan is arranged in said first outlet channel and said drive shaft extends outwardly out of said first outlet channel, and wherein said fan is located on a fan plane that extends perpendicularly relative to an axis of said drive shaft; and a heat exchanger having first and second heat exchange passages that are in heat exchange relation with each other, wherein said heat exchanger is interposed between said air inlet channel and said outlet plenum to establish flow communication from said air inlet channel through said second heat exchange passage to said outlet plenum;

wherein said unified outlet channel leads to and terminates at an exhaust air outlet;

wherein said unified outlet channel extends from said air mixing junction downstream toward said exhaust air outlet, on the same side of said fan plane as said drive shaft extending outwardly out of said first outlet channel; and wherein said air mixing junction comprises an injector flap that is fixedly mounted to said downstream end of said first outlet channel and protrudes therefrom into a flow cross-section of said second outlet channel while extending toward said unified outlet channel, and that is flexibly deflectable thereby variably reducing a dimensional size of said flow cross-section.

* * * * *